United States Patent
Stauner et al.

[11] 3,754,923
[45] Aug. 28, 1973

[54] PHOTOGRAPHIC SILVER HALIDE MATERIAL CONTAINING DISAZO DYES FOR THE SILVER DYESTUFF BLEACHING PROCESS

[75] Inventors: Thomas Stauner, Marly-le-Grand; Bernhard Piller, Marly-le-Petit; Alfred Froehlich, Marly-le-Grand, all of Switzerland

[73] Assignee: Ciba-Geigy AG, Basel, Switzerland

[22] Filed: Dec. 30, 1971

[21] Appl. No.: 214,456

Related U.S. Application Data

[63] Continuation of Ser. No. 18,311, March 10, 1970, abandoned.

[30] Foreign Application Priority Data

Mar. 25, 1969 Switzerland.......................... 4478/69

[52] U.S. Cl........................... 96/99, 96/73, 260/177
[51] Int. Cl............................................... G03c 1/10
[58] Field of Search.................................. 96/99, 73

[56] References Cited
UNITED STATES PATENTS

| | | | |
|---|---|---|---|
| 2,612,448 | 9/1952 | Gaspar et al............................. | 96/99 |
| 2,612,496 | 9/1952 | Gaspar et al............................. | 96/99 |

*Primary Examiner*—Norman G. Torchin
*Assistant Examiner*—Richard L. Schilling
*Attorney*—Harry Goldsmith et al.

[57] ABSTRACT

A photographic light-sensitive material, especially for the silver dyestuff bleaching process is provided, which contains on a support in at least one layer, at least one dyestuff of the formula

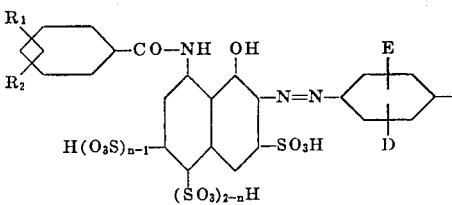

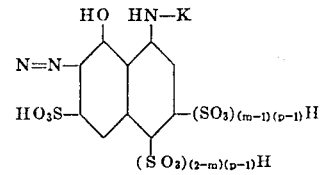

in which $R_1$, $R_2$, D and E are organic radicals, $R_1$ and $R_2$ being in the 3-, 4- or 5-positions to the —CO— group, K is an acyl radical and $m$, $n$ and $p$ each equals 1 or 2. These dyestuffs are resistant to diffusion, form stable aqueous solutions, can be easily bleached, are fast to light and have favourable spectral properties.

17 Claims, No Drawings

PHOTOGRAPHIC SILVER HALIDE MATERIAL CONTAINING DISAZO DYES FOR THE SILVER DYESTUFF BLEACHING PROCESS

This is a continuation of application Ser. No. 18,311, filed Mar. 10, 1970, now abandoned.

This invention provides photographic light-sensitive material, especially for the silver dyestuff bleaching process, which contains on a support in at least one layer, at least one dyestuff of the formula (1)

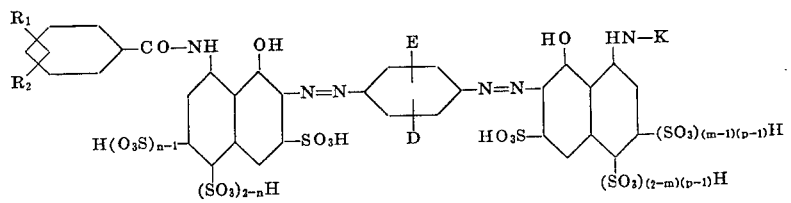

wherein $R_1$ denotes a halogen atom, a nitro, cyano, trifluoromethyl, lower alkyl or alkoxy group or a residue of the formula $-NH-CO-X$, $-NH-SO_2-Y$, $-SO_2-Z$ or $-CO-W$, in which X represents a hydroxyl, HOOC-alkyl, HOOC-alkenyl, HOOC-phenyl, $HO_3S$-phenyl, phenyl, furyl, thienyl or pyridyl group, Y represents a lower alkyl or a phenyl, alkylphenyl or HOOC-phenyl group, Z represents a hydroxyl, lower alkyl, phenyl or a substituted or unsubstituted amino group and W represents a lower alkyl or alkoxy group, or a hydroxyl, phenyl or substituted or unsubstituted amino group, $R_2$ denotes a hydrogen atom or has the significance indicated for $R_1$, $R_1$ and $R_2$ being in the 3-, 4- or 5-positions to the $-CO-$ group, D and E independently of one another each denotes a hydrogen or chlorine atom or a methyl, methoxy, ethoxy or hydroxyethoxy group, K denotes an acyl radical of an aliphatic or aromatic carboxylic or sulphonic acid which may be further substituted, or of a heterocyclic carboxylic acid, and $m$, $n$ and $p$ each equals 1 or 2.

Preferred dyestuffs correspond to the formula (2)

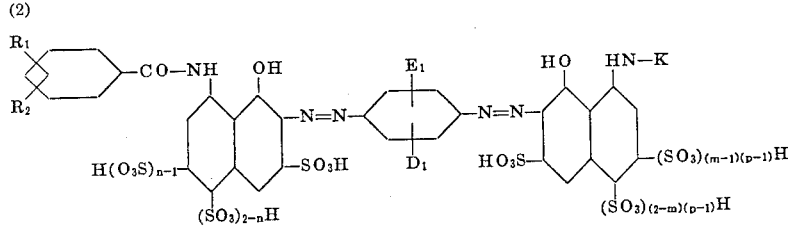

wherein $D_1$ and $E_1$ independently of one another each denotes a methyl, methoxy, ethoxy or hydroxyethoxy group and $R_1$, $R_2$, K, $m$, $n$ and $p$ have the significance indicated.

Particularly suitable dyestuffs correspond to the formula (3)

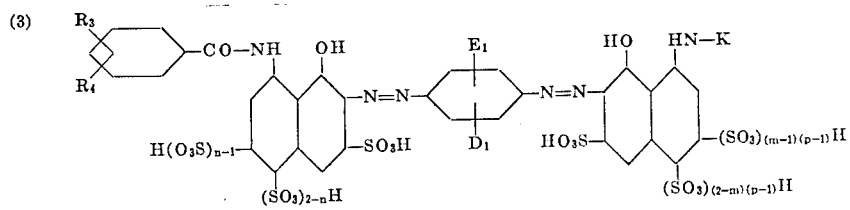

wherein $R_3$ denotes a hydrogen or halogen atom or a nitro group, $R_4$ denotes a halogen atom, a nitro, cyano, trifluoromethyl, lower alkyl or alkoxy group or a residue of the formula $-NH-CO-X_1$, $-NH-SO_2-Y_1$, $-SO_2-Z_1$ or $-CO-W_1$, in which $X_1$ represents an HOOC-alkyl, HOOC-alkenyl, HOOC-phenyl or phenyl group, $Y_1$ represents a lower alkyl or alkylphenyl group or a phenyl group, $Z_1$ represents a lower alkyl, phenyl or substituted or unsubstituted amino group and $W_1$ represents a lower alkyl or alkoxy group or a phenyl or hydroxyl group, and K, $m$, $n$ and $p$ have the significance indicated, and $R_3$ and $R_4$ are in the 3-, 4- or 5-positions to the $-CO-$ group.

Good results are also obtained with dyestuffs of the formula (4)

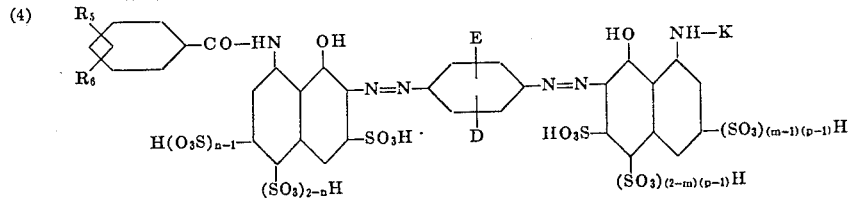

wherein $R_5$ denotes a halogen atom, a nitro, trifluoromethyl, lower alkyl or alkoxy group, or a radical of the formula $-NH-CO-X$, $-NH-SO_2-Y$, $-SO_2-Z_2$ or $-CO-W_1$, in which X represents a hydroxyl, HOOC-alkyl, HOOC-alkenyl, HOOC-phenyl, $HO_3S$-phenyl, phenyl, furyl, thienyl or pyridyl group, Y represents a lower alkyl or a phenyl, alkylphenyl or HOOC-phenyl group and $Z_2$ represents a hydroxyl, lower alkyl or a substituted or unsubstituted amino group, $W_1$ represents a lower alkyl or alkoxy group or a phenyl or hydroxyl group R₆ denotes a hydrogen atom or has the significance indicated for R₅, R₅ and R₆ being in the 3-, 4- or 5-positions to the —CO— group, D and E independently of one another each denotes a hydrogen or chlorine atom or a methyl, methoxy, ethoxy or hydroxyethoxy group, K denotes an acyl radical of an aliphatic or aromatic carboxylic or sulphonic acid which may be further substituted or of a heterocyclic carboxylic acid, $E_1$, $W_1$ X, Y, K, $m$ and $n$ have the significance indicated.

The lower alkyl or alkoxy radicals in $R_1$, $R_2$, $R_4$, $R_5$, $R_6$ and $R_7$ are preferably those having at most 5 carbon atoms. Similarly, the alkyl or alkenyl radicals in X or $X_1$ and Y or $Y_1$ preferably contain at most five carbon atoms.

Dyestuffs of the formula

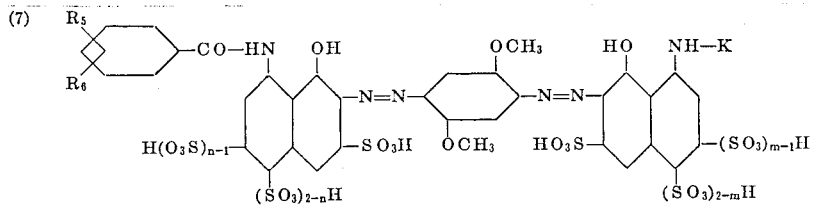

and $m$, $n$ and $p$ each equals 1 or 2.

Photographic material of special interest contains a dyestuff of the formula wherein $R_5$, $R_6$, K, $n$ and $m$ have the significance indicated, are preferentially used.

Photographic material which contains at least one

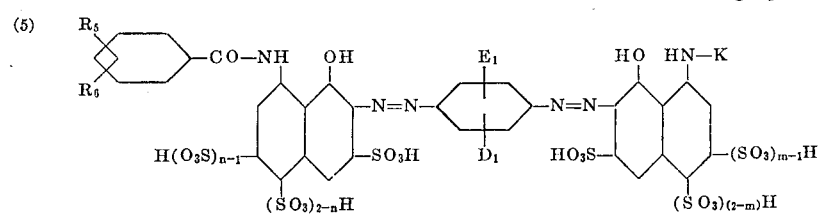

wherein Rhd 5, $R_6$, $D_1$, $E_1$, K, $m$ and $n$ have the significance indicated.

The radicals D and E and/or $D_1$ and $E_1$, where they do not represent hydrogen atoms, are preferably in the paraposition to one another.

dyestuff of the formula

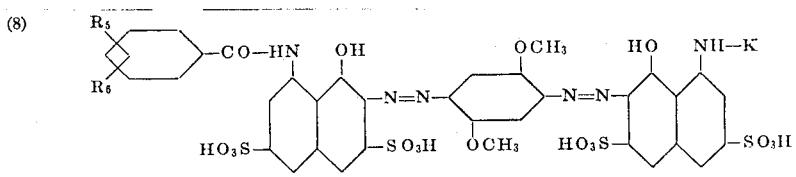

wherein $R_5$, $R_6$ and K have the significance indicated, is particularly advantageous.

Amongst the dyestuffs of formulae (6) and (8), those of the formula

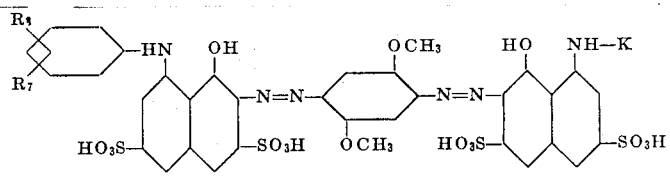

Very suitable dyestuffs of formulae (3) and (5) are those of the formula v, wherein $R_3$, $R_7$ and K have the significance indicated, should be particularly emphasised.

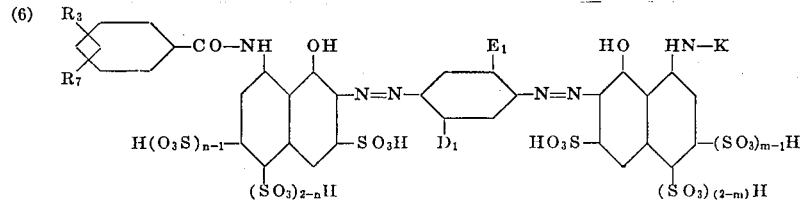

wherein $R_7$ denotes a halogen atom, a nitro, trifluoromethyl, lower alkyl or alkoxy group or a radical of the Dyestuffs of the formula (9) with a preferred acyl radical K correspond to the formula

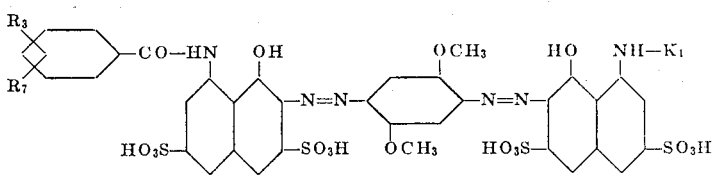

formula —NH—CO—X, —NH—SO₂—Y, —SO₂—Z₃ or —CO—W₁, wherein Z₃ represents a lower alkyl or substituted or unsubstituted amino group, and $R_3$, $D_1$, wherein $K_1$ denotes the acyl radical of an alkanecarboxylic acid having preferably at most 6 carbon atoms, a substituted or unsubstituted benzene carboxylic or pyridine carboxylic acid or a substituted or unsubstituted benzene sulphonic acid, and $R_3$ and $R_7$ have the significance indicated.

Advantageous results are obtained when using dyestuffs of the formula

(11)
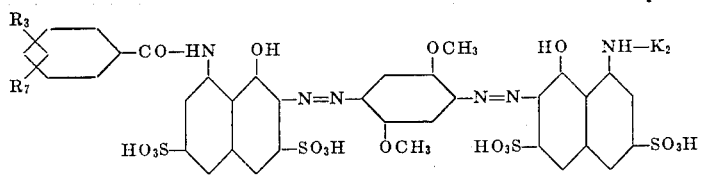

wherein $K_2$ denotes the acyl radical of a benzene carboxylic acid which may be substituted by alkylsulphone groups which contain at most five carbon atoms, halogen atoms, especially chlorine or bromine atoms, or nitro, trifluoromethyl or amidosulphone groups, or denotes the radical of a benzene sulphonic acid or pyridine carboxylic acid, and $R_3$ and $R_7$ have the significance indicated.

Photographic material which contains at least one dyestuff of the formula

(12)
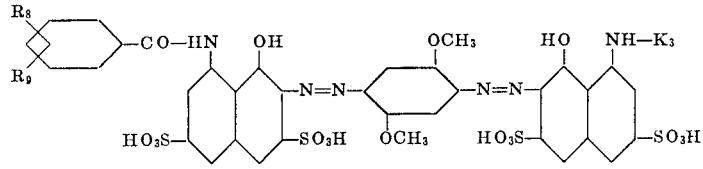

wherein $R_8$ denotes a chlorine or bromine atom, a nitro, trifluoromethyl, $H_2N-SO_2-$, $H_3C-NH-SO_2-$, $H_3C-SO_2-NH-$, $H_5C_6-SO_2-NH-$, $H_3C-\langle\bigcirc\rangle-SO_2-NH-$, $H_5C_6-CO-NH-$, $HOOC-(CH_2)_2-CO-NH-$, $HOOC-(CH_2)_3-CO-NH-$, $HOOC-CH=\lambda CH-CO-NH-$, $HOOC-$, $H_3CO-$, $H_9C_4-$, $\langle\bigcirc\rangle-CO-$ or $HOOC-\langle\bigcirc\rangle-CO-NH-$ group, $R_9$ denotes a hydrogen or chlorine atom, the radicals $R_8$ and $R_9$ being in the 3- and 4-positions to the —CO— group, and $K_3$ represents the acyl radical of pyridine-3-carboxylic acid or of a benzene carboxylic acid of the formula (12a)
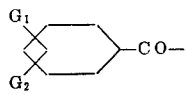

wherein $G_1$ denotes a hydrogen or halogen atom, especially a chlorine or bromine atom, and $G_2$ denotes a hydrogen or halogen atom, especially a chlorine or bromine atom, or a nitro, trifluoromethyl or $Z_3-SO_2-$ group, wherein $Z_3$ represents a lower alkyl or substituted or unsubstituted amino group. Preferably, the lower alkyl group in $Z_3$ is a methyl radical.

In particular, however, dyestuffs of the formula

(13)
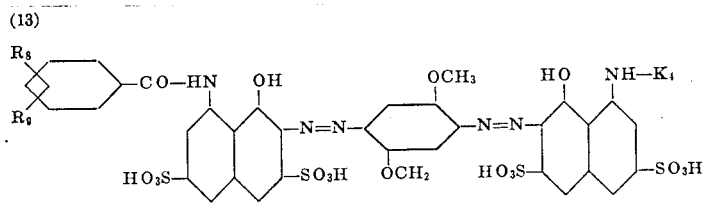

wherein $K_4$ represents the acyl radical of pyridine-3-carboxylic acid or of a benzene carboxylic acid of the formula (13a)
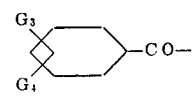

wherein $G_3$ denotes a hydrogen or chlorine atom and $G_4$ denotes a hydrogen or chlorine atom or a nitro, trifluoromethyl or $H_2N-SO_2-$group and $R_8$ and $R_9$ have the significance indicated, are of particular interest.

Amongst the dyestuffs of formula (13), those of the formula

(14)
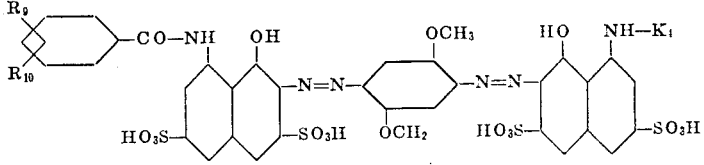

wherein $R_{10}$ denotes a chlorine atom, a nitro group or a $H_2N-SO_2-$group and $R_9$ and $K_4$ have the significance indicated and the radicals $R_9$ and $R_{10}$ are in the 3- and 4-positions to the —CO— group, are preferred.

Particularly advantageous results are obtained by using dyestuffs of the formula

(15)
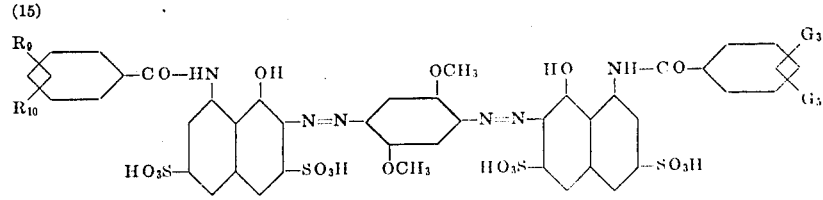

wherein $G_3$ denotes a hydrogen or chlorine atom and $G_5$ denotes a hydrogen or chlorine atom or an $H_2N—SO_2—$ group, and $R_9$ and $R_{10}$ have the significance indicated.

Amongst the dyestuffs of formula (3), those of the formula (16)

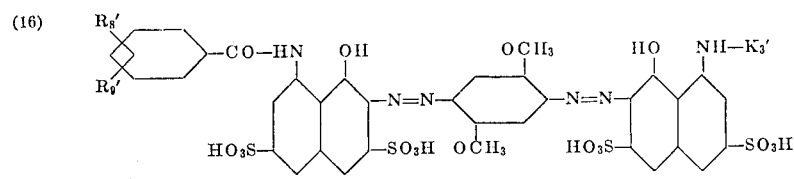

should be emphasised, wherein $R_8'$ represents a chlorine or bromine atom or a cyano, a nitro, trifluoromethyl, $H_2N—SO_2—$, $H_3C—NH—SO_2—$, $H_3C—SO_2—$, $H_5C_6—SO_2—$, $H_3C—SO_2—NH—$, $H_5C_6—SO_2—NH—$,

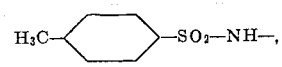

$H_5C_6—CO—NH—$, $H_5C_6—CO—$, $HOOC—(CH_2)_2—CO—NH—$, $HOOC—(CH_2)_3—CO—NH—$, $HOOC—CH=CH—CO—NH—$, $HOOC—$, $H_3CO—$, $H_3COOC—$,

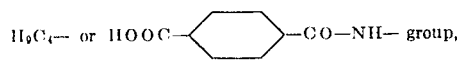

$R_9'$ represents a nitro group or a hydrogen or chlorine atom and $K_3'$ represents the acyl radical of pyridine-3-carboxylic acid, benzene sulphonic acid or a benzene carboxylic acid of the formula (16a)

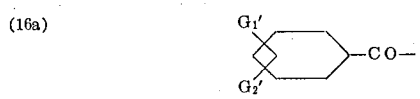

wherein $G_1'$ denotes a hydrogen or chlorine atome and $G_2'$ denotes a hydrogen or chlorine atom, or a nitro, trifluoromethyl, $H_3C—SO_2—$ or $H_2N—SO_2—$ group.

Advantageous results are particularly obtained with dyestuffs of the formula (17)

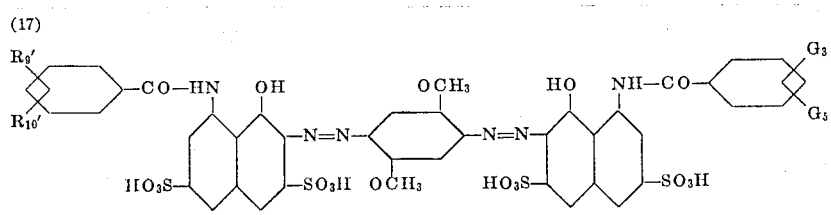

wherein $R_9'$, $G_3$ and $G_5$ have the significance indicated and $R_{10}'$ denotes a chlorine or bromine atom or a nitro, $H_2N—SO_2—$, $H_3C—SO_2—$, $H_3COOC—$, $H_3C—SO_2—NH—$ or NC— group.

The dyestuffs of formulae (16) and (17) include very suitable cyan dyestuffs, which for example correspond to formulae (101) to (109) and (130) to (135) of Table I hereinafter.

The dyestuffs of formulae (1) to (17) cannot only be in the form of their free acids as indicated, that is to say having HOOC— or $HO_3S—$ groups, but also as salts. Depending on the conditions under which the dyestuff is separated, for example on the chosen pH value or on the cation which is present in the salt used for separating, the acid groups can be in the form of $—SO_3—$ or —COO—cation groups, for example $—SO_3Na$, $—SO_3K$, $(—SO_3)_2Ca$, —COONa, —COOLi and $—COONH_4$, that is to say, preferably with salts of the alkaline earth metal group or especially the alkali metal group or ammonium.

The radicals

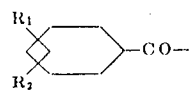

in the dyestuffs of formula (1) may for example be derived from the following acids or halides: 4-nitrobenzoic acid, 3-nitrobenzoic acid, 4-chlorobenzoic acid, 3-chlorobenzoic acid, 3,4-dichlorobenzoic acid, 4-bromobenzoic acid, 3-trifluoromethylbenzoic acid, 4-trifluoromethylbenzoic acid, 3-toluic acid, 4-toluic acid, 4-fluorobenzoic acid, 4-t-butylbenzoic acid, 4-chloro-3-methylbenzoic acid, 4-chloro-3-nitrobenzoic acid, 3-methoxy-4-nitrobenzoic acid, 3-sulphamoylbenzoic acid, 3-methylsulphamoylbenzoic acid, 4-sulphamoylbenzoic acid, 4-chloro-3-sulphamoylbenzoic acid, 4-chloro-3-methylsulphamoylbenzoic acid, 3-methylsulphonylbenzoic acid, 4-methylsulphonylbenzoic acid, 4-benzoylaminobenzoic acid and 4-chloro-3-methylsulphonylbenzoic acid.

The radical K in the dyestuffs of formula (1) may for example be derived from the following acids or their halides: 4-chlorobenzoic acid, 3-chlorobenzoic acid, 2-chlorobenzoic acid, 4-nitrobenzoic acid, 3-nitrobenzoic acid, 2,4-dichlorobenzoic acid, 2,5-dichlorobenzoic acid, 3,4-dichlorobenzoic acid, 4-chloro-3-nitrobenzoic acid, 2-chloro-4-nitrobenzoic acid, 3-trifluoromethylbenzoic acid, 4-trifluoromethylbenzoic acid, 3-toluic acid, 4-toluic acid, 4-fluorobenzoic acid, 4-acetylaminobenzoic acid, 3-acetylaminobenzoic acid, 4-methoxybenzoic acid, 3-chloro-4-methoxybenzoic acid, 3-methoxy-4-nitrobenzoic acid, 3,5-dimethoxybenzoic acid, 3-methoxybenzoic acid, 4-chloro-3-methylbenzoic acid, 3-sulphamoylbenzoic acid, 4-sulphamoylbenzoic acid, 4-chloro-3-sulphamoylbenzoic acid, 4-chloro-3-methylsulphamoylbenzoic acid, 3-methylsulphamoylbenzoic acid, 4-methylsulphonylbenzoic acid, 4-chloro-3-methylsulphonylbenzoic acid, 4-bromobenzoic acid, 3-bromobenzoic acid, nicotinic acid, isonicotinic acid, pyridine-2-carboxylic acid, benzoic acid, 4-t-butyl-benzoic acid, 4-acetylbenzoic acid, 4-methoxycarbonylbenzoic acid, 3-succinylaminobenzoic acid, 4-succinylaminobenzoic acid, 3-glutarylaminobenzoic acid, 4-glutarylaminobenzoic acid, 3-fumaroylaminobenzoic acid, 4-fumaroylaminobenzoic acid, 3-benzenesulphonylaminobenzoic acid, 4- benzenesulphonylaminobenzoic acid, 3-tosylaminobenzoic acid, 4-tosylaminobenzoic acid, 3methylsulphonylaminobenzoic acid, 4-methylsulphonylaminobenzoic acid, 3-furoylaminobenzoic acid, 4-furoylaminobenzoic acid, 3-pyridoylaminobenzoic acid, 4-pyridoylaminobenzoic acid, 3-thenoylaminobenzoic acid and 4-thenoylaminobenzoic acid.

The radicals —SO$_2$Y or —SO$_2$Y$_1$ in the radicals —NHSO$_2$Y or —NHSO$_2$Y$_1$ which occur as substituents R$_1$, R$_2$ and R$_4$, R$_5$ and R$_7$, may for example be derived from the following acids or their halides: methane sulphonic acid, benzene sulphonic acid, 4-methylbenzene sulphonic acid or 3-sulphobenzoic acid.

The radicals —CO—X or —CO—X$_1$ in the radicals —NHCOX or —NHCOX$_1$ which occur as substituents R$_1$, R$_2$, R$_4$, R$_5$ and R$_7$ may for example be derived from the following acids or succinic halides or anhydrides: formic acid, maleic acid, fumaric acid, succinis acid, glutaric acid, benzoic acid, terephthalic acid, isophthalic acid, 3-sulphobenzoic acid, furane-2-carboxylic acid, thiophene-2-carboxylic acid and pyridine-2-, -3- and -4-carboxylic acid.

The radicals

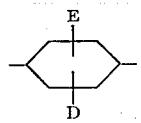

may for example be derived from the following amines: 1-amino-2,3-dimethoxy-4-nitrobenzene, 1-amino-2,5-dimethoxy-4-nitrobenzene, 1-amino-2,6-dimethoxy-4-nitrobenzene, 1-amino-2-chloro-5-methoxy-4-acetylaminobenzene, 1-amino-2-methoxy-4-nitrobenzene, 1-amino-2-hydroxyethoxy-4-nitrobenzene, 1amino-2,5-dimethoxy-4-acetylaminobenzene, 1-amino-2,5-dimethoxy-4-formylaminobenzene, 1-amino-2,5-dimethoxy-4-formylaminobenzene, 1-amino-2-chloro-4-nitrobenzene, 1-amino-3-chloro-4-nitrobenzene, 1-amino-2-methyl-4-nitrobenzene, 1-amino-2-ethoxy-4-nitrobenzene, 1-amino-2-chloro-5-methyl-4-acetylaminobenzene, 1-amino-2-methyl-5-chloro-4-nitrobenzene, 1-amino-2-chloro-5-methyl-4-acetylaminobenzene, 1-amino-2-chloro-5-hydroxyethoxy-4-acetylaminobenzene, 1-amino-2-methyl-5-methoxy-4-nitrobenzene, 1-amino-2-methoxy-5-chloro-4-nitrobenzene, 1-amino-2-methoxy-5-methyl-4-nitrobenzene, 1-amino-2-methoxy-5-hydroxyethoxy-4-nitrobenzene, 1-amino-2-hydroxyethoxy-5-chloro-4-nitrobenzene, 1-amino-2-hydroxy-ethoxy-5-methyl-4-nitrobenzene, 1-amino-2,5-diethoxy-4-nitrobenzene and 1-amino-2,5-dichloro-4-nitrobenzene.

The dyestuffs of formula (1) can be manufactured according to various known processes. Thus an amine of the formula (18a)

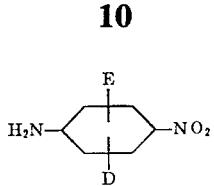

or the formula (18b)

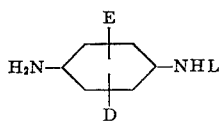

whereun L denotes a protective group which can be split off, and D and E have the significance indicated, may be diazotised and coupled with a 1-acylamino-8-hydroxynaphthalene disulphonic acid of the formula (19)

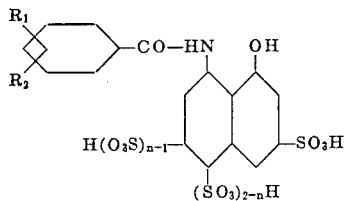

wherein R$_1$, R$_2$ and $n$ have the significance indicated. After reduction of the nitro group to the amino group or splitting off the protective group, the product is again diazotised and coupled with a 1-acylamino-8-hydroxynaphthalene disulphonic acid of the formula (20)

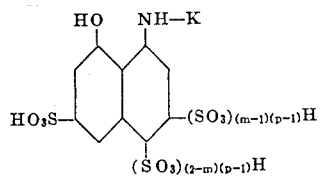

wherein K, $m$, $n$ and $p$ have the significance indicated. Similarly, an amine of formula (18a) or (18b) may be diazotised and coupled with the compound of formula (20) and after reduction of the nitro group to the amino group or splitting off the protective group and further dizotisation, the aminoazo dyestuff thus obtained is coupled with the compound of formula (19).

In the synthesis of dyestuffs having NO$_2$— or SO$_2$NH$_2$— groups in R$_1$, R$_2$ and/or K, for example dyestuffs of formulae (101) to (105), (107) to (110), (113), (115), (116), (119), (120), (125) to (127) and (129) given below, it is advantageous first to manufacture the aminomonoazo dyestuff which is free from such groups, for example those of the formulae (2.3), (2.4) and (2.8) given below, andthen diazotise and couple it with the second coupling component containing NO$_2$— or SO$_2$NH$_2$— groups, for example those of the formulae (1.3), (1.4), (1.8), (1.32) or (1.33) given below.

Dyestuffs having the radicals —NH—COX or —NY—SO$_2$Y in R$_1$ or K, wherein X and Y have the significance indicated, for example those of the formula (21)

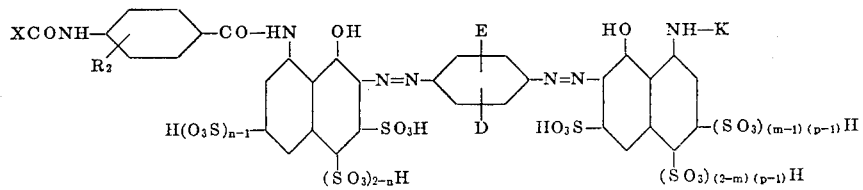

wherein X, $R_2$, E, D, K, $m$, $n$ and $p$ have the significance indicated, can also be manufactured by first synthesising a dyestuff of the formula

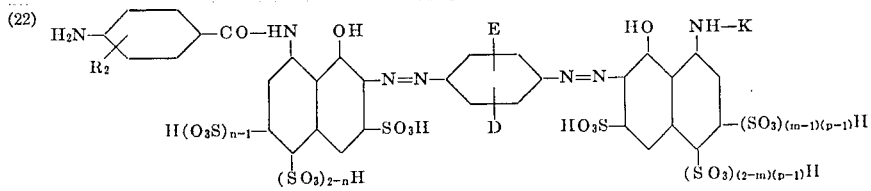

wherein $R_2$, E, D, K, $m$, $n$ and $p$ have the significance indicated, in accordance with one of the methods of manufacture described above, and subsequently condensing the free amino group with one of the acid halides or anhydrides from which the radicals —COX and —$SO_2$Y are derived.

The dyestuffs of formula (1) may be used particularly advantageously in photographic materials as image dyestuffs for the silver dyestuff bleaching process. Valuable photographic materials which contain at least one layer having at least one dyestuff of formula (1) on a layer support, can be manufactured in known manner.

In particular, these dyestuffs can be present in a multi-layer material which contains on a layer support, a layer which is dyed green-blue with a dyestuff of formula (1) and is selectively red-sensitive, on top of this a layer dyed with a magenta dyestuff, which is selectively green-sensitive, andfinally a layer dyed with a yellow dyestuff, which is selectively blue-sensitive. The dyestuffs of formula (1) may also be present in an auxiliary layer or particularly in a layer adjacent to the light-sensitive layer. The extremely advantageous and not easily obtained combination of numerous outstanding properties in one molecule which is realised in the dyestuffs of formula (1) becomes particularly apparent when they are used as dyestuffs for images for direct viewing. Furthermore the dyestuffs of formula (1) can also be used for retouching purposes.

In most cases it suffices to add the dyestuffs to be used according to the invention as a solution in water or in a solvent which is miscible with water to an aqueous gelatine solution at normal or slightly elevated temperature with good stirring. Thereafter, where appropriate, this mixture is brought together with gelatine containing silver halide and/or other materials for the production of photographic images, cast onto a substrate in the usual manner to give a layer, and dried, if necessary.

The dyestuff solution can also be added directly to gelatine containing silver halide and/or other materials for the production of photographic images. Thus for example the dyestuff solution may be added only just before casting.

Instead of simple stirring, the usual methods of distribution by means of kneading and/or shear forces or ultrasonics can also be employed. The dyestuff may also be added in the solid form or as a paste instead of in solution.

The casting solution can also contain further additives for example hardeners, sequestering agents and wetting agents as well as sensitisers and stabilisers for the silver halide.

The dyestuffs neither undergo chemical reactions with the light-sensitive materials nor significantly impair their light-sensitivity.

The dyesutffs of formula (1) possess excellent resistance to diffusion, but also as well form stable aqueous solutions which are insensitive towards calcium ions, and can be bleached white without difficulty. Thus they are significantly faster to light and diffusion than, for example, the dyestuffs of the formula

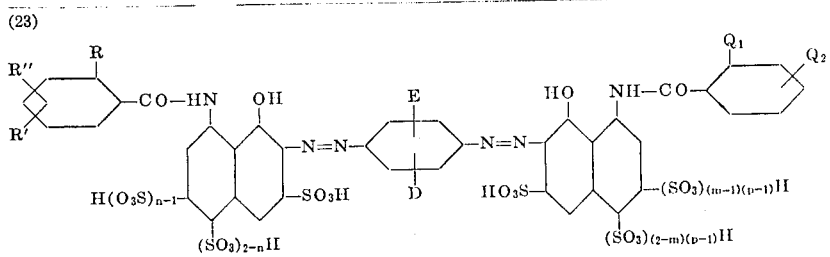

wherein R and $Q_1$ each denotes any desired substituent, R', R'' and $Q_2$ each denotes a hydrogen atom or any desired substituent and E, D, $m$, $n$, and $p$ have the significance indicated. The dyestuffs of formula (1) cause neither a troublesome rise in viscosity on addition to the casting solution nor any significant change in viscosity when the ready-to-cast mixture is left to stand.

The particular advantage of the dyestuffs of formula (1) however resides in their extremely favourable spectral properties. Their absorption maximum in gelatine is in the range of from 600 to 650 nm so that in particular they can be combined with a suitable magenta dyestuff and an appropriate yellow dyestuff to form a triple dyestuff combination which has significantly more advantageous properties as regards exposure metamerism when compared with materials containing other cyan dyestuffs. Furthermore, grey shades which appear neutral to the eye can be obtained over the entire density range.

The dyestuffs of formula (1) have particularly low subsidiary colour densities in the green and blue spectral region and a low transmission in the red spectral region. The flanks of the absorption curves are extremely steep, particularly towards the shorter wavelengths.

MANUFACTURING INSTRUCTIONS

1. Instructions for the Manufacture of 1-Acylamino-8-hydroxynaphthalene-3,6-disulphonic acids 1a. 101.5 g of 78.6 percent 1-amino-8-hydroxynaphthalene-3,6-disulphonic acid are suspended in 500 ml of water and dissolved at a pH value of 7.5 by adding 40% sodium hydroxide solution. The solution is heated to 40° to 50°C and a total of 88 g of 3-nitro-4-chlorobenzoyl chloride is added in portions of 2 to 3 g with good stirring, the pH value of the solution being maintained at between 6 and 7.5 by a dropwise addition of 40 percent sodium hydroxide solution. The mixture is stirred for a further 2 hours at the same temperature, heated to 60° to 70°C, acidified with 37 percent hydrochloric acid to pH 2, and the reaction product precipitated with 300 ml of ethanol. After cooling, the yellowish crystals are filtered and the product is washed with a little ethanol. For further purification, the product is dissolved in 300 ml of water by heating to 80°C and again precipitated with 300 ml of ethanol. The misture is allowed to cool and the crystals are filtered, washed with ethanol and dried in vacuo at 60°C and 150 mm Hg.

Yield: 75 g of 1-(4'-chloro-3'-nitrobenzoylamino)-8-hydroxynaphthalene-3,6-disulphonic acid.

The thin layer chromatogram indicates a single substance.

The infra-red and nuclear resonance spectrum is in agreement with the requisite structure.

1b. 19.1 g of 83.7 percent 1-amino-8-hydroxynaphthalene-3,6-disulphonic acid are suspended in 50 ml of N-methyl-pyrrolidone and 50 ml of pyridine (dried over sodium sulphate) at 60°C by means of good stirring, and treated in portions during one hour with 26 g of 4-methoxybenzoyl chloride, provision being made by means of an oil bath for the temperature to rise to 90°C towards the end of the addition. The mixture is left to react at this temperature for 2 hours, cooled to 60°C and stirred for a further 3 hours. After cooling, the solvent and the excess 4-methoxybenzoyl chloride are extracted from the reaction mixture with ether, the oily residue is dissolved in 30 ml of water and treated with 37 percent hydrochloric acid until pH 1 is reached, and the reaction mixture is precipitated with saturated sodium chloride solution. After standing for 12 hours, the produce is filtered, crystallised from a little ethanol/water (2:1) and dried in vacuo at 60°C and 150 mm Hg.

Yield: 10 g of 1-(4'-methoxybenzoylamino)-8-hydroxynaphthalene-3,6-disulphonic acid.

The chromatogram indicates a single substance. The infra-red andnuclear resonance spectra are in agreement with the requisite structure.

The 1-acylamino-8-hydroxynaphthalene-3,6-disulphonic acids of the following formulae can also be manufactured according to instruction 1a):

(1.1) 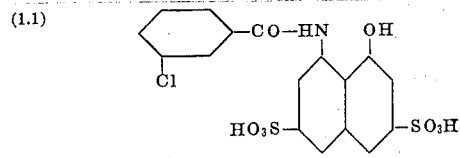

(1.2) 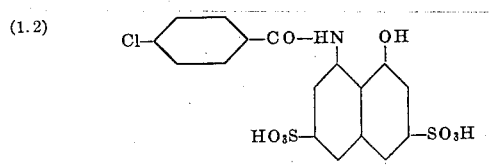

(1.3) 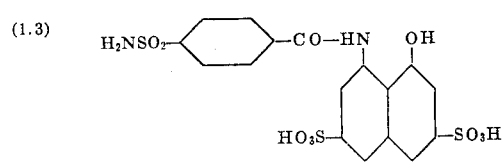

(1.4) 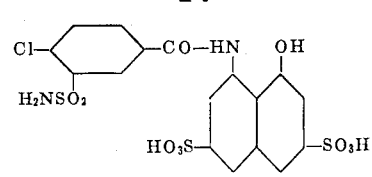

(1.5) 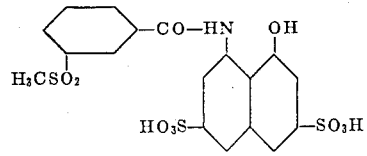

(1.6) 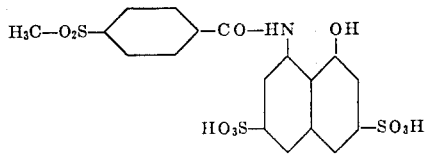

(1.7) 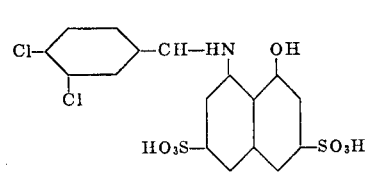

(1.8) 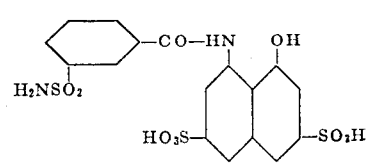

(1.9) 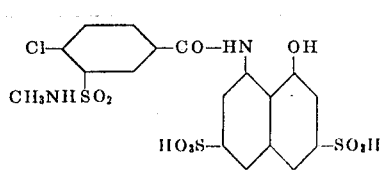

(1.10) 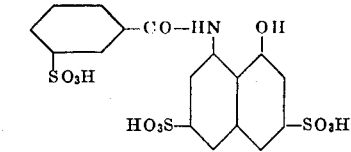

(1.11) 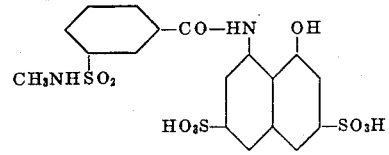

(1.12) 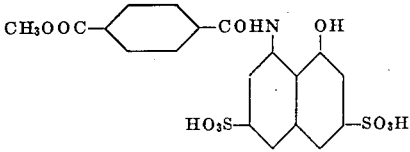

(1.13) 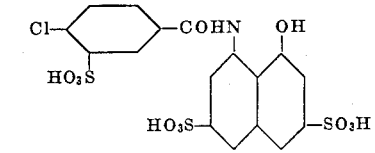

(1.14) 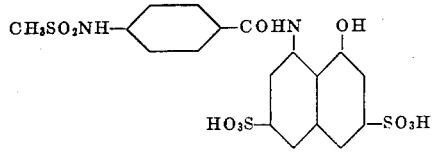

(1.15) 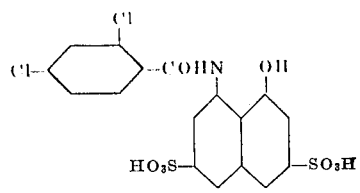

(1.16) 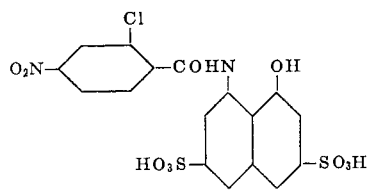

(1.17) 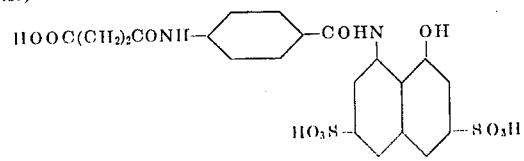

(1.18) 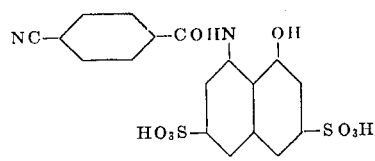

(1.19) 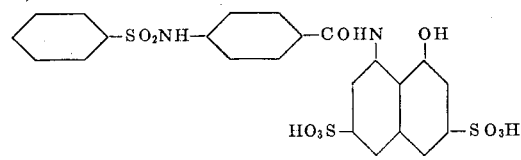

(1.20) 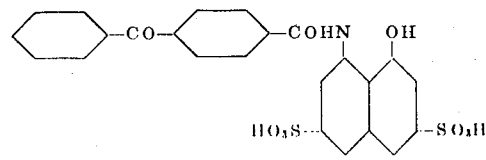

(1.21) 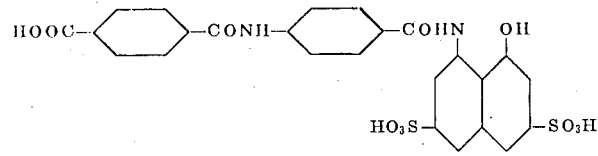

(1.22) 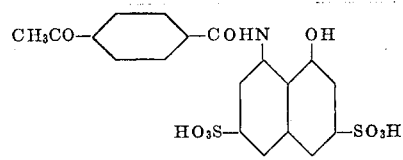

(1.23) 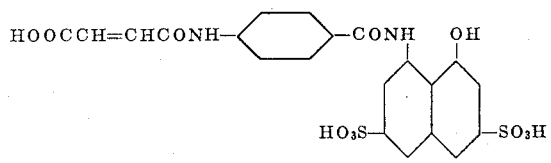

The 1-acylamino-8-hydroxynaphthalene-3,6-disulphonic acids of the following formulae can be obtained according to instruction 1b):

(1.24) 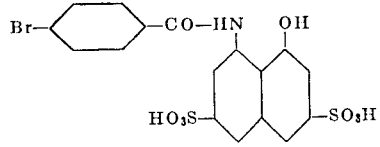

(1.25) 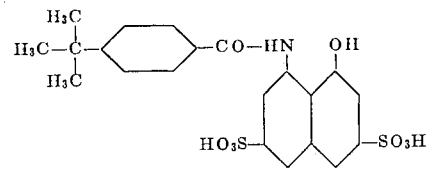

(1.26) 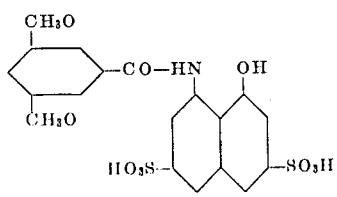

(1.27) 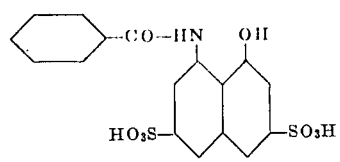

(1.28) 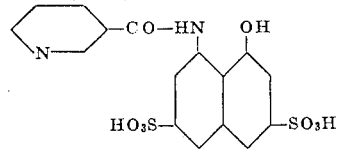

(1.29) 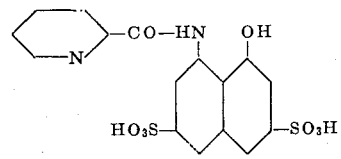

(1.30) 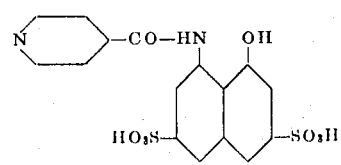

1c. 31.9 g of 1-amino-8-naphthol-3,6-disulphonic acid are dissolved in 300 ml of water at pH 7.0, 16.4 g of anhydrous sodium acetate are added and the solution is mixed with 16.7 ml of 3-trifluoromethylbenzoyl fluoride during 15 minutes under reflux and whilst stirring. After 30 minutes a further 16.7 ml of 3-trifluoromethylbenzoyl fluoride are added, the pH value is adjusted to 10.0 with sodium carbonate, the mixture is heated under reflux for 30 minutes, and the pH value is finally adjusted to 4.5 by addition of 37 percent hydrochloric acid. The resulting precipitate is filtered and dried. The product of the formula (1.31) 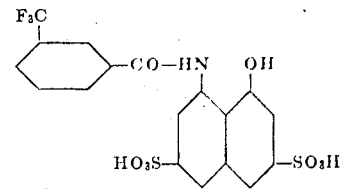

is obtained in 80 percent yield as a light beige powder.

1d. 115 g of 1-amino-8-naphtholbenzene sulphonic acid ester-3,6-disulphonic acid are dissolved at 90°C in 300 ml of N-methyl-2-pyrrolidone, 30 ml of pyridine and 58 g of 3-nitrobenzoyl chloride are added, and the mixture is stirred for 5 minutes at 175°C. The reaction solution is cooled to 20°C and mixed with 1 litre of ethanol, whereupon the beige coloured reaction product precipitates. It is filtered, washed with ethanol and dried in vacuo. The product of the formula (1.32) 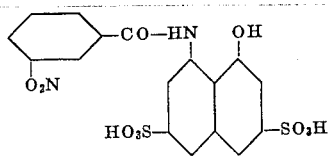

is obtained in very good yield. The compound of the formula (1.33) 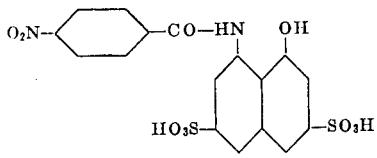

is obtained in a similar manner.

2. Instruction for the Manufacture of Aminomonoazo Dyestuffs 24.8 g of 2,5-dimethoxy-4-nitroaniline are emulsified in 50 ml of water and 2.5 ml of a 1 percent solution of a condensation product of 1 mol of p-tert.-octylphenol and 8 mols of ethylene oxide by stirring for 30 minutes at 20°C. 45 ml of 37 percent hydrochloric acid are run in with intensive external cooling (in order not to disturb the fine distribution), so that the temperature does not rise above 5°C, and 32.8 ml of 4 N sodium nitrite solution are added all at once, care being taken that the temperature does not exceed 7° to 8°C by adding lumps of ice. A clear diazo solution is obtained within 30 minutes and is filtered to remove constituents which are still solid.

In the meantime, 83 g of 1-(4'-chlorobenzoylamino)-8-hydroxynaphthalene-3,6-disulphonic acid of formula (1.2) are dissolved in 400 ml of water and the pH value is adjusted to 7.2 with 40 percent sodium hydroxide solution. 60 g of sodium tetraborate are added with good stirring, the pH value is raised to 10.2 by means of 40 ml of 40 percent sodium hydroxide solution, and the solution is cooled to 5° to 6°C by adding lumps of ice.

The above diazo solution is run in a thin stream into the solution of the coupling component, and the whole is stirred for a further hour. Thereafter the reaction mixture is treated with 310 ml of 1 molar sodium sulphide solution and the nitroazo dyestuff is reduced to the amino-azo dyestuff at 40°C and a pH value of 10 to 11. After 5 hours the reduction is complete (recognisable from the single blue spot on the chromatogram). The pH value of the solution is reduced to 7.5 with 37 percent hydrochloric acid, whereupon the dyestuff precipitates in an easily filtrable form. The product is filtered and washed with 20 percent sodium chloride solution until the filtrate is only pale yellow. In order to free the dyestuff from the sulphur which has separated, the filter cake is dissolved in 2 litres of water, the solution is heated to 90° to 95°C, and the sulphur which has separated out is filtered. The dyestuff is obtained from the filtrate by precipitation with saturated sodium chloride solution.

Yield: 72 g of the dyestuff of the formula (2.1) 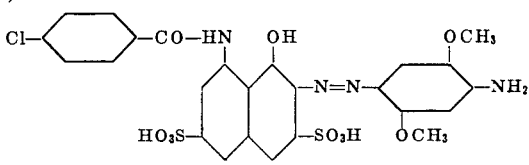

The chromatogram shows a single spot.

The aminoazo dyestuffs of the following formulae can be manufactured in a similar manner:

(2.2) 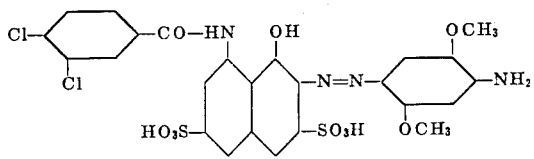

(2.3) 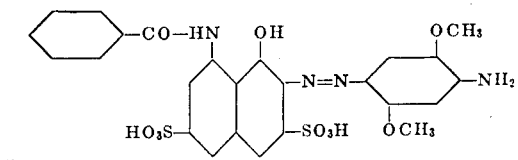

(2.4) 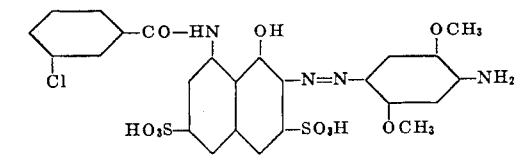

(2.5) 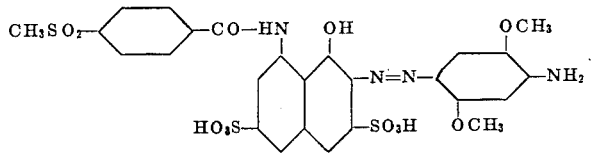

(2.6) 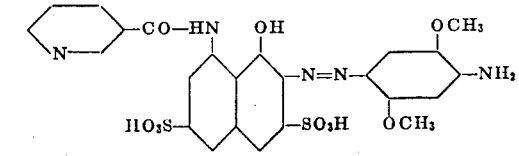

(2.7) 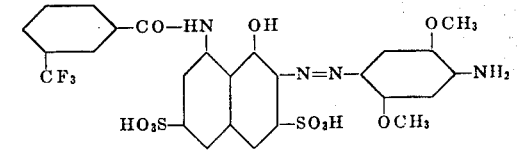

(2.8) 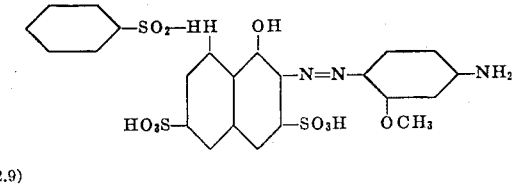

(2.9) 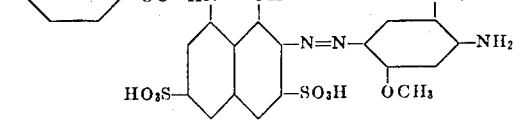

(2.10) 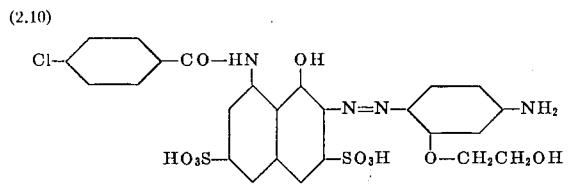

(2.11) 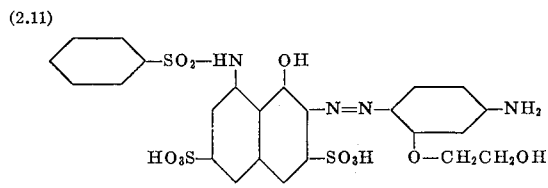

(2.12) 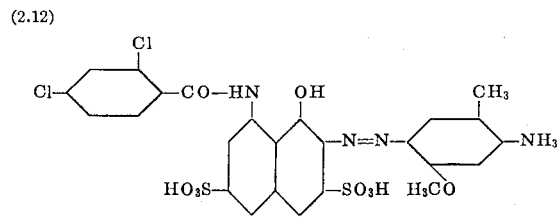

(2.13) 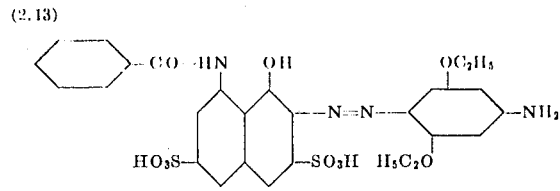

(2.14) 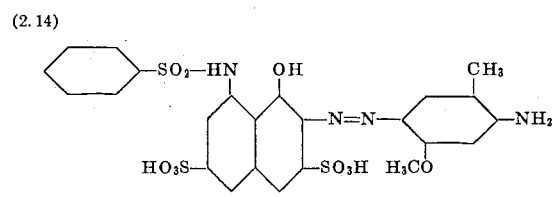

(2.15) 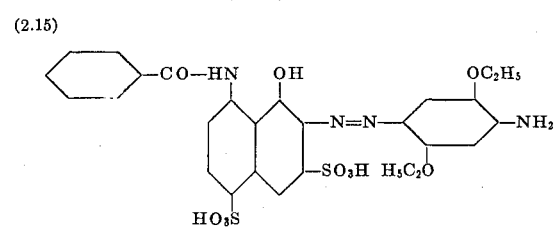

(2.16) 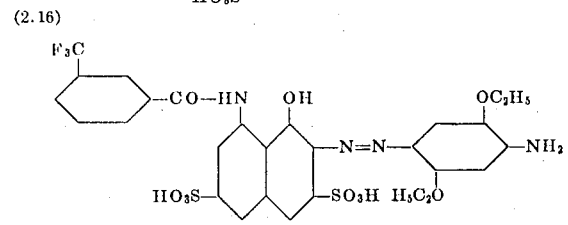

(2.17) 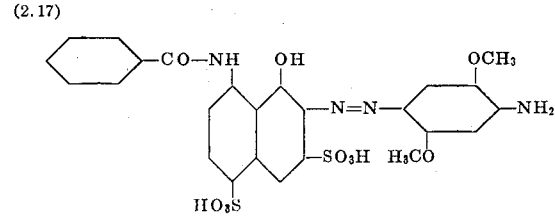

(2.18) 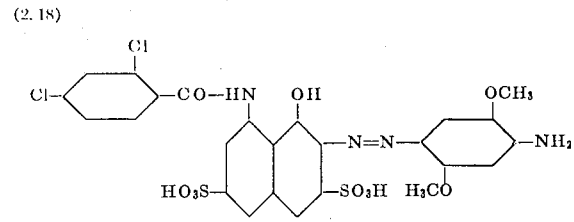

3. Instructions for the Manufacture of Dyestuffs of Formula (1)

3a. 80 g of the aminoazo dyestuff of formula (2.3) are dissolved in the form of the sodium salt in 900 ml of water, mixed with 80 ml of a naphthalene sulphonic acid solution (100 ml contain 1/10 mol of naphthalene-1-sulphonic acid and 1/10 mol of sulphuric acid, representing a total of 3/10 equivalents of acid). The mixture is cooled to 0°C and diazotised by adding 18.4 ml of 4 N sodium nitrite solution all at once. The reaction is allowed to proceed for 45 minutes at 0° to 5°C whilst stirring, the slight excess of nitrous acid is removed with a few drops of sulphamic acid, and the diazo solution is allowed to run at 0° to 5°C within 15 minutes into a solution of 70 g of the compound of formula (1.33) in 250 ml of water, 250 ml of pyridine and 1 ml of 24 percent ammonia. During the addition of the diazo solution the pH value is kept between 9.5 and 10. The mixture is stirred for 1 hour at 20°C, heated to 70°C, and the dyestuff precipitated from the hot solution with hot ethanol and filtered while still hot. The filter cake is washed with hot ethanol until the initially reddish filtrate runs colourless. For further purification, the residue is dissolved in 1 litre of water at 70°C and the dyestuff is again precipitated with hot ethanol with the addition of a few drops of 7 N potassium acetate solution. The product is filtered hot and washed with hot ethanol until the filtrate runs colourless. The residue is dried in vacuo at 60°C/150 mm Hg.

Yield: 42.1 g of the dyestuff of formula (101) of Table I.

3b. A diazo solution manufactured according to instruction 3a) from 3.5 g of the aminoazo dyestuff of formula (2.4) is run during 10 minutes at 0° to 5°C into a solution of 4 g of the 1-amino-8-naphthol derivative of formula (1.8) in 50 ml of water, 60 ml of pyridine and 4 ml of 24 percent ammonia. The pH value during coupling should be between 9 and 9.5. The mixture is stirred for one hour at 20°C, heated to 70°C, and the dyestuff precipitated with hot ethanol. The further purification of the dyestuff is carried out according to instruction 3a).

Yield: 3.1 g of the dyestuff of formula (103).

The chromatogram indicates a single substance.

The dyestuffs (101), (102), (104) to (121), (130) to (149), (152) to (155) of Table I can also be manufactured according to instructions 3a) and 3b).

3c. 4.85 g of the aminoazo dyestuff of formula (2.7) are dissolved in the form of the sodium slat in 100 ml of water, mixed with 5 ml of a naphthalene sulphonic acid solution (100 ml of this solution contain 1/10 mol of naphthalene-1-sulphonic acid and 1/10 mol of sulphuric acid, that is to say a total of 3/10 equivalents of acid) and diazotised with 1.4 ml of 4 N sodium nitrite solution at 5°C.

The mixture is allowed to react for one hour at 5°C whilst stirring and thereafter the excess sodium nitrite is destroyed by adding the requisite amount of sulphamic acid. The diazo solution is added at 15°C to a solution of 11.6 g of the compound of formula (1.31) and 1 g of sodium tetraborate in 50 ml of water and 15 ml of pyridine. The pH value is kept at 9.7 during the entire coupling by adding 5 N sodium carbonate solution. After one hour the dyestuff which has separated is filtered and purified by recrystallisation from dimethylformamide/water (1:1). The compound of formula (122) of the Dyestuff Table I hereafter is obtained in good yield, and in acceptable quality according to a thin layer chromatogram, as a dark blue powder.

The dyestuffs of formulae (123) and (124) may be obtained in a similar manner. The dyestuffs of formulae (125) to (129), (150) and (151) may be similarly obtained from the compounds of formulae (1.2), (1.3), (1.32) and (1.33).

Table I below characterises the dyestuffs of formulae (101) to (155). The symbols $R_1$, $R_2$, D, E and K represent radicals in the formula Depending on the way in which the product is separated, the free acids or sodium or potassium salts of these dyestuffs are obtained.

Column I gives the formula number and column II the absorptions maximum in nm, in which column IIa gives the value measured in dimethylformamide/water, 1:1, and column IIb the value measured in gelatine. In the dyestuff of formula (141) the sulphonic acid groups in the right-hand side naphthalene radical of formula (24) are in the 3,5-position instead of the 3,6-position.

(24)

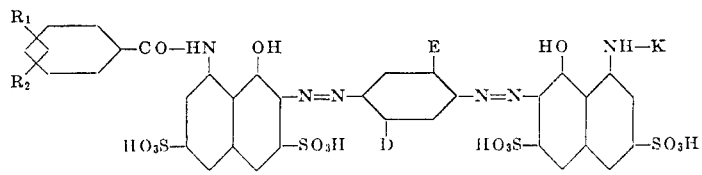

TABLE I

| I | $R_1$ | $R_2$ | D | E | K | IIa | IIb |
|---|---|---|---|---|---|---|---|
| 101 | 4-NO$_2$ | H | OCH$_3$ | OCH$_3$ | —CO—⟨ ⟩ | 670+718 | 620 |
| 102 | 4-SO$_2$NH$_2$ | H | —OCH$_3$ | OCH$_3$ | —CO—⟨ ⟩ | 676+723 | 620 |
| 103 | 3-SO$_2$NH$_2$ | H | —OCH$_3$ | —OCH$_3$ | —CO—⟨ ⟩-Cl | 670+728 | 618 |
| 104 | 4-Cl | H | —OCH$_3$ | —OCH$_3$ | —CO—⟨ ⟩-SO$_2$NH$_2$ | 670+715 | 620 |
| 105 | 3-SO$_2$NH$_2$ | H | —OCH$_3$ | —OCH$_3$ | —CO—⟨ ⟩ | 670+720 | 616 |
| 106 | 4-Cl | H | —OCH$_3$ | —OCH$_3$ | —CO—⟨ ⟩ | 676+722 | 615 |
| 107 | 3-NO$_2$ | 4-Cl | —OCH$_3$ | —OCH$_3$ | —CO—⟨ ⟩ | 670+716 | 618 |
| 108 | 4-Cl | H | OCH$_3$ | —OCH$_3$ | —CO—⟨ NO$_2$ ⟩-Cl | 676+714 | 625 |
| 109 | 4-NO$_2$ | H | OCH$_3$ | OCH$_3$ | —CO—⟨ Cl ⟩-Cl | 674+734 | 622 |
| 110 | 3-NO$_2$ | 5-NO$_2$ | OCH$_3$ | OCH$_3$ | —CO—⟨ ⟩ | 674+722 | 630 |
| 111 | 3-CF$_3$ | H | OCH$_3$ | OCH$_3$ | —CO—⟨ Cl ⟩-Cl | 672+717 | 602 |
| 112 | 3-CF$_3$ | H | OCH$_3$ | OCH$_3$ | —CO—⟨ ⟩ | 672+724 | 608 |
| 113 | 4-Cl | H | OCH$_3$ | —OCH$_3$ | —CO—⟨ ⟩-NO$_2$ | 676+720 | 622 |
| 114 | 4-Br | H | —OCH$_3$ | —OCH$_3$ | —CO—⟨ Cl ⟩ | 674+720 | 630 |
| 115 | 3-NO$_2$ | H | —OCH$_3$ | —OCH$_3$ | —CO—⟨ ⟩ | 674+722 | 621 |
| 116 | 3-SO$_2$NH$_2$ | 4-Cl | —OCH$_3$ | —OCH$_3$ | —CO—⟨ ⟩ | 670+727 | 619 |

| I | R₁ | R₂ | D | E | K | Hₐ | Hᵦ |
|---|----|----|---|---|---|----|----|
| 117 | 4-Cl | H | —OCH₃ | —OCH₃ | —CO—◯—Cl | 672+716 | 623 |
| 118 | 4-Cl | H | —OCH₃ | —OCH₃ | —CO—C₅H₁₁ | 670+712 | 620 |
| 119 | 3-Cl | H | —OCH₃ | —OCH₃ | —CO—◯—NO₂ | 672+728 | 622 |
| 120 | 3-Cl | H | —OCH₃ | —OCH₃ | —CO—◯(NO₂) | 670+728 | 620 |
| 121 | 3-SO₂NHCH₃ | 4-Cl | —OCH₃ | —OCH₃ | —CO—◯ | 672+728 | 622 |
| 122 | 3-CF₃ | H | —OCH₃ | —OCH₃ | —CO—◯(CF₃) | 670+730 | 626 |
| 123 | 3-CF₃ | H | —OC₂H₅ | —OC₂H₅ | —CO—◯ | 674+728 | 680 |
| 124 | 3-CF₃ | H | H | —OCH₂CH₂OH | —SO₂—◯ | 632+680 | 638+698 |
| 125 | 3-NO₂ | H | —OC₂H₅ | —OC₂H₅ | —CO—◯ | 674+726 | 680 |
| 126 | 4-NO₂ | H | —OC₂H₅ | —OC₂H₅ | —CO—◯ | 674+726 | 680 |
| 127 | 4-NO₂ | H | H | —OCH₃ | —SO₂—◯ | 632+680 | 639+698 |
| 128 | 4-Cl | H | H | —OCH₂CH₂OH | —SO₂—◯ | 632+680 | 639+698 |
| 129 | 4-SO₂NH₂ | H | H | —OCH₃ | —SO₂—◯ | 632+680 | 638+698 |
| 130 | 4-Br | H | —OCH₃ | —OCH₃ | —CO—◯ | 672+732 | 621 |
| 131 | 4-NHSO₂CH₃ | H | —OCH₃ | —OCH₃ | —CO—◯ | 669+729 | 616 |
| 132 | 4-COOCH₃ | H | —OCH₃ | —OCH₃ | —CO—◯ | 670+729 | 623 |
| 133 | 3-SO₂CH₃ | H | —OCH₃ | —OCH₃ | —CO—◯ | 668+728 | 618 |
| 134 | 4-SO₂CH₃ | H | —OCH₃ | —OCH₃ | —CO—◯ | 670+729 | 619 |
| 135 | 4-CN | H | —OCH₃ | —OCH₃ | —CO—◯ | 668+727 | 617 |
| 136 | 4-NHSO₂—◯ | H | —OCH₃ | —OCH₃ | —CO—◯ | 668+729 | 614 |
| 137 | 4-NHSO₂—◯ | H | —OCH₃ | —OCH₃ | —CO—◯(Cl,Cl) | 668+728 | 617 |
| 138 | 4-CO—◯ | H | —OCH₃ | —OCH₃ | —CO—◯(Cl) | 667+727 | 623 |
| 139 | 4-NHCO—◯—COOH | H | —OCH₃ | —OCH₃ | —CO—◯(Cl) | 668+729 | 624 |
| 140 | 4-Cl | H | —OCH₃ | —OCH₃ | —CO—◯(N) | 670+729 | 619 |
| 141 | 4-Cl | H | —OCH₃ | —OCH₃ | —CO—◯ | 666+724 | 622 |

| I | R₁ | R₂ | D | E | K | IIa | IIb |
|---|---|---|---|---|---|---|---|
| 142 | 4-COOH | H | —OCH₃ | —OCH₃ | —CO—⟨phenyl⟩ | 669+729 | 623 |
| 143 | 4-NHCOCH₂CH₂COOH | H | —OCH₃ | —OCH₃ | —CO—⟨phenyl⟩ | 677+738 | 633 |
| 144 | 4-NHCO—⟨phenyl⟩ | H | —OCH₃ | —OCH₃ | —CO—⟨phenyl-Cl⟩ | 674+730 | 621 |
| 145 | 3-SO₂NH₂ | H | —OCH₃ | —OCH₃ | —CO—⟨pyridyl⟩ | 660+607 | 620 |
| 146 | 4-Cl | H | —OCH₃ | —OCH₃ | —CO—⟨phenyl-SO₂NH₂⟩ | 676+720 | 621 |
| 147 | 4-OCH₃ | H | —OCH₃ | —OCH₃ | —CO—⟨phenyl-Cl,Cl⟩ | 674+734 | 634 |
| 148 | 4-t-Butyl | H | —OCH₃ | —OCH₃ | —CO—⟨phenyl-Cl,Cl⟩ | 675+734 | 627 |
| 149 | 4-SO₂—⟨phenyl⟩ | H | —OCH₃ | —OCH₃ | —CO—⟨phenyl-Cl⟩ | 675+736 | 613 |
| 150 | 4-Cl | H | —H₃C | —OCH₃ | —CO—⟨phenyl⟩ | 642+700 | 589+732 |
| 151 | 4-NO₂ | H | H | —OCH₂CH₂OH | —SO₂—⟨phenyl⟩ | 632+678 | 638+696 |
| 152 | 4-NHSO₂—⟨phenyl⟩—CH₃ | H | —OCH₃ | —OCH₃ | —CO—⟨phenyl-SO₂CH₃⟩ | 672+719 | --- |
| 153 | 4-NHCO(CH₂)₃COOH | H | —OCH₃ | —OCH₃ | —CO—⟨phenyl-Cl⟩ | 670+722 | --- |
| 154 | 4-NHCOCH=CHCOOH | H | —OCH₃ | —OCH₃ | —CO—⟨phenyl-SO₂NH₂⟩ | 674+725 | --- |
| 155 | 4-COOCH₃ | H | —OCH₃ | —OCH₃ | —CO—⟨phenyl⟩ | 676+736 | 625 |

EXAMPLE 1

3.3 ml of a 6 percent gelatine solution, 2.0 ml of a 1 percent aqueous solution of the hardener of the formula (25)

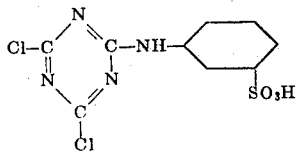

0.5 ml of a 1 percent aqueous solution of the cyan dyestuff of formula (106) and 3.3 ml of silver bromide emulsion which contains 35 g of silver per litre are pipetted into a test tube and made up to 10.0 ml with deionised water. This solution is vigorously mixed and kept for 5 minutes at 40°C in a water bath. The casting solution at 40°C is cast onto a substrated glass plate size 13 cm.18 cm. After solidifying at 10°C, the plate is dried in a drying cabinet with circulating air at 32°C. A strip cut to 3.5 cm.18cm is exposed for 3 seconds with 50 Lux/cm² under a step wedge through a Kodak 2b + 49 blue filter. Thereafter the process is continued as follows:

1. 7 minutes development in a bath which contains per litre 20 g of anhydrous sodium sulphite, 1 g of 4-methylaminophenol sulphate, 4 g of hydroquinone, 10 g of anhydrous sodium carbonate and 2 g of potassium bromide;
2. 2 minutes stop-fixing in a bath which contains per litre 200 g of sodium thiosulphate, 15 g of sodium sulphite, 25 g of crystalline sodium acetate and 13 ml of glacial acetic acid;
3. 2½ minutes soaking;
4. 8 minutes colour bleaching in a bath which contains per litre 70 ml of 37 percent hydrochloric acid, 50 g of potassium bromide, 80 g of thiourea, 5 mg of colour bleaching catalyst of the formula (26)

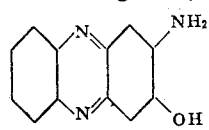

and 20 ml of a mixture of 500 ml of diethylene glycol and 500 ml of water;

5. 2 minutes soaking;
6. 8 minutes bleaching of residual silver in a bath which contains per litre 100 ml of 37 percent hydrochloric acid, 50 g of crystalline copper sulphate and 45 of potassium ofpotassium bromide;
7. 2 minutes soaking;
8. 4 minutes fixing as indicated under 2.;
9. 10 minutes soaking.

A brilliant blue-green wedge very fast to light is obtained which is bleached completely white in the position of the originally greatest silver density.

Similar results are obtained when a different dyestuff of Table I is used instead of the dyestuff of formula (106).

EXAMPLE 2

The following layers are successively applied to an opaque white acetate film provided with an adhesive layer:

1. Red-sensitive silver bromide emulsion in gelatine, containing the cyan dyestuff of formula (101).
2. Colourless gelatine layer without silver halide.
3. Green-sensitive silver bromide emulsion in gelatine, containing the magenta dyestuff of the formula (27)

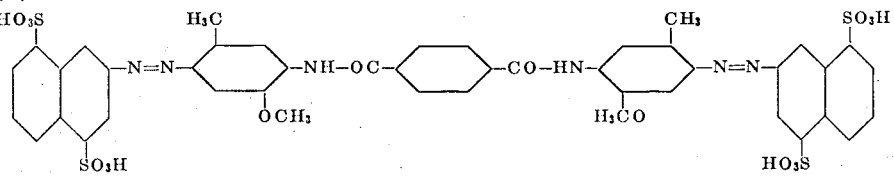

4. Blue-sensitive silver bromide emulsion in gelatine containing the yellow dyestuff of the formula (28)

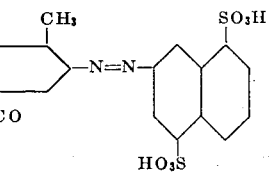

The gelatine layers can further contain additives for example wetting agents, hardeners and stabilisers for the silver halide. In other respects the procedure followed is such that the individual layers contain per square metre 0.5 g of the particular dyestuff and an amount of silver bromide corresponding to 1 to 1.2 g of silver.

This film is exposed to red, green and blue copying light under a coloured diapositive. Thereafter the copy is developed in accordance with the following instruction:

1. 6 minutes development in a bath which contains per litre of water 50 g of anhydrous sodium sulphite, 0.2 g of 1-phenyl-3-pyrazolidone, 6 g of hydroquinone, 35 g of anhydrous sodium carbonate, 4 g of potassium bromide and 0.3 g of benztriazole;
2. 5 minutes soaking;
3. 6 minutes fixing in a solution of 200 g of crystalline sodium thiosulphate and 20 g of potassium metabisulphite in 1 litre of water;
4. 5 minutes soaking;

5. 3 to 12 minutes colour bleaching with a solution which contains per litre of water 50 to 80 g of potassium bromide, 40 to 80 g of thiourea, 35 to 80 g of 30 percent sulphuric acid and 0.001 to 0.01 g of the colour bleaching catalyst of formula (26);
6. 10 minutes soaking;
7. 5 minutes bleaching of residual silver with a solution of 60 g of a crystalline copper sulphate, 80 g of potassium bromide and 15 ml of 30 percent hydrochloric acid per litre of water;
8. 5 minutes soaking;
9. 5 minutes fixing as indicated under 3.;
10. 5 minutes soaking.

A light-stable, document-fast positive viewing image is obtained.

Similar results are obtained when another dyestuff from Table I is used instead of the dyestuff of formula (101).

EXAMPLE 3

3.3 ml of a 6 percent gelatine solution, 2.0 ml of a 1 percent aqueous solution of the hardener of formula (25) and 0.5 ml of a 1 percent aqueous solution of the cyan dyestuff of formula (102) are pipetted into a test tube and made up to 10.0 ml with deionised water. The whole is thoroughly mixed and kept for 5 minutes at 40°C in a water bath. The casting solution at 40°C is cast onto a substrated glass plate size 13 cm.18 cm. After solidification at 10°C, the plate is dried in a drying cabinet with circulating air at 32°C.

A mixture of 3.3 ml of a 6 percent gelatine solution, 2.0 ml of 1 percent aqueous solution of the hardener of formula (25), 3.3 ml of silver bromide emulsion containing 35 g of silver per litre, and 1.4 ml of deionised water is then applied to the dried layer at 40°C. The whole is allowed to solidify and dry as indicated above.

A strip, cut to 3.5 cm.18 cm, is exposed for 10 seconds with 50 Lux/cm² under a step wedge through a Kodak 2b + 49 blue filter. Thereafter the procedure described in Example 1 is followed but instead of the colour bleaching catalyst of formula (26) the colour bleaching catalyst of the formula (29)

is used. A brilliant, blue-green wedge very fast to light is obtained which is bleached completely white in the area of the originally greatest silver density.

29

Similar results are obtained when one of the other dyestuffs of Table I is used instead of the dyestuff of formula (102).

EXAMPLE 4

A test strip manufactured and exposed in accordance with Example 1, using the cyan dyestuff of formula (134), is processed according to the following method:
1. 5 minutes development in a bath which contains per litre 1 g of p-methylaminophenol sulphate, 20 g of anhydrous sodium sulphite, 4 g of hydroquinone, 10 g of anhydrous sodium carbonate, 2 g of potassium bromide and 3 g of sodium thiocyanate;
2. 2 minutes soaking;
3. 2 minutes treatment in a reversal bath which contains per litre 5 g of potassium bichromate and 5 ml of 96 percent sulphuric acid;
4. 4 minutes soaking;
5. 5 minutes treatment in a bath which contains 50 g of anhydrous sodium sulphite per litre;
6. 3 minutes soaking;
7. 4 minutes development in a bath which contains per litre 2 g of 1-phenyl-3-pyrazolidone, 50 g of anhydrous sodium carbonate, 2 g of sodium hexametaphosphate and 20 ml of a 1 percent aqueous solution of tert.-butylaminoborane;
8. 2 minutes soaking;
9. further treatment as indicated in Example 1 under 4. to 9.

A brilliant, blue-green wedge very fast to light running counter to the original used is obtained.

Similar results are obtained when using one of the other dyestuffs of Table I.

We claim:
1. Photographic light-sensitive material that contains on a support in at least one layer containing silver halide a dyestuff of the formula

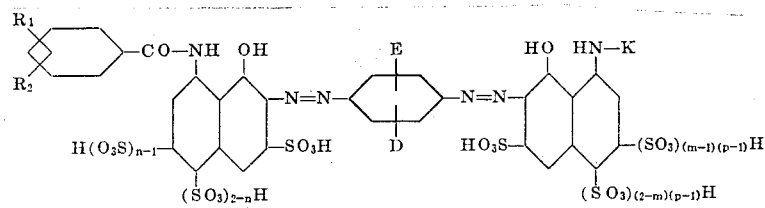

in which $R_1$ denotes a halogen atom, a nitro, cyano, trifluoromethyl, lower alkyl or alkoxy group or a radical of the formula $-NH-CO-X$, $-NH-SO_2-Y$, $-SO_2-Z$ or $-CO-W$, in which X represents a hydroxyl, HOOC-alkyl, HOOC-alkenyl, HOOC-phenyl, $HO_3S-$ phenyl, phenyl, furyl, thienyl or pyridyl group,

30

Y represents a lower alkyl or a phenyl, alkylphenyl or HOOC-phenyl group, Z represent a hydroxyl, lower alkyl, phenyl amino or alkylamino group and W represents a lower alkyl or alkoxy group, or a hydroxyl, phenyl or unsubstituted amino group, $R_2$ denotes a hydrogen atom or has the significance indicated for $R_1$, $R_1$ and $R_2$ being in the 3-, 4- or 5-positions to the $-CO-$ group, D and E independently of one another each denotes a hydrogen or chlorine atom or a methyl, methoxy, ethoxy or hydroxyethoxy group, K denotes an acyl radical of an aliphatic or aromatic carboxylic or sulphonic acid, or of a heterocyclic carboxylic acid, and m, n and p each equals 1 or 2.

2. Photographic light-sensitive material as claimed in claim 1, that contains a dyestuff of the formula

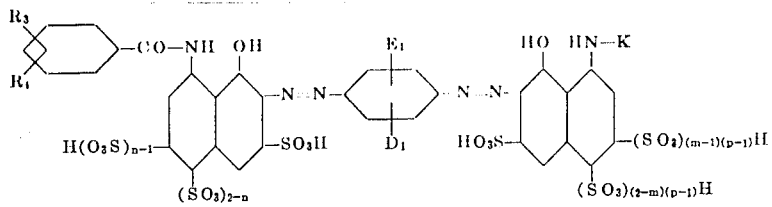

in which $R_3$ denotes a hydrogen or halogen atom or a nitro group, $R_4$ denotes a halogen atom, a nitro, cyano, trifluoromethyl, lower alkyl or alkoxy group or a radical of the formula $-NH-CO-X_1$, $-NH-SO_2-Y_1$, $-SO_2-Z_1$ or $-CO-W_1$, in which $X_1$ represents an HOOC-alkyl, HOOC-alkenyl, HOOC-phenyl or phenyl group, $Y_1$ represents a lower alkyl or alkylphenyl group or a phenyl group, $Z_1$ represents a lower alkyl, phenyl amino or alkylamino group and $W_1$ represents a lower alkyl or alkoxy group or a phenyl or hydroxyl group, $D_1$ and $E_1$ independently of one another each denotes a methyl, methoxy, ethoxy or hydroxy-ethoxy group and K, m, n and p have the significance indicated in claim 1, and $R_3$ and $R_4$ are in the 3-, 4- or 5-positions to the $-CO-$ group.

3. Photographic light-sensitive material which contains, on a support in at least one layer at least one dyestuff of the formula

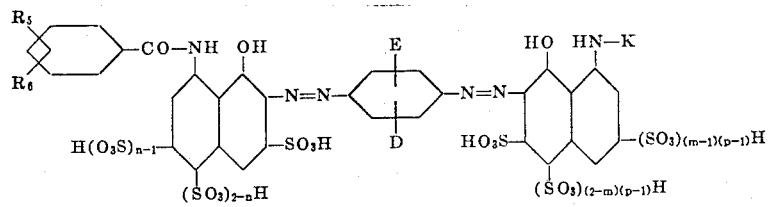

in which $R_5$ denotes a halogen atom, a nitro, trifluoromethyl, lower alkyl or alkoxy group, or a radical of the formula $-NH-CO-X$, $-NH-SO_2-Y$, $-SO_2-Z_2$ or $-CO-W_1$, in which X represents a hydroxyl, HOOC-alkyl, HOOC-alkenyl, HOOC-phenyl, $HO_3S-$ phenyl, phenyl, furyl, thienyl or pyridyl group, Y represents a lower alkyl or a phenyl, alkylphenyl or HOOC-phenyl group and $Z_2$ represents a hydroxyl, lower alkyl amino or alkylamino group, $W_1$ represents a lower alkyl or alkoxy group or a phenyl or a hydroxyl group, $R_6$ denotes a hydrogen atom or has the significance indicated for $R_5$, $R_5$ and $R_6$ being in the 3-, 4- or 5-positions to the —CO— group, D and E independently of one another each denotes a hydrogen or chlorine atom or a methyl, methoxy, ethoxy or hydroxyethoxy group, K denotes an acyl radical of an aliphatic or aromatic carboxylic or sulphonic acid or of a heterocyclic carboxylic acid, and $m$, $n$ and $p$ each equals 1 or 2.

4. Photographic material according to claim 3, that contains a dyestuff of the formula

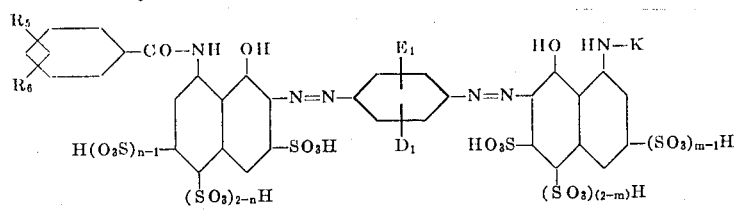

in which $R_5$, $R_6$, K, $m$ and $n$ have the significance indicated in claim 3 and D and E independently are methyl, methoxy, ethoxy or hydroxyethoxy.

5. Photographic material as claimed in claim 2 that contains a dyestuff of the formula

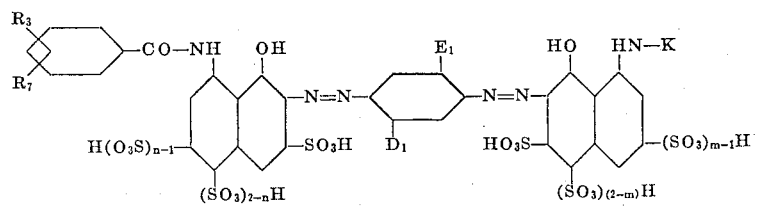

in which $R_7$ denotes a halogen atom, a nitro, trifluoromethyl, lower alkyl or alkoxy group or a radical of the formula —NH—CO—X, —NH—SO$_2$—Y, —SO$_2$—Z$_3$, or, —CO—W$_1$, in which Z$_3$ represents a lower alkyl, amino or alkylamino group, and $R_3$, $D_1$, $E_1$, W, K, $m$ and $n$ have the significance indicated in claim 2, X is hydroxyl, HOOC-alkyl, HOOC-alkenyl, HOOC-phenyl, HO$_3$S-phenyl, phenyl, furyl, thienyl or pyridyl and Y is lower alkyl, phenyl, alkylphenyl, or HOOC-phenyl.

6. Photographic material as claimed in claim 3 that contains at least one dyestuff of the formula

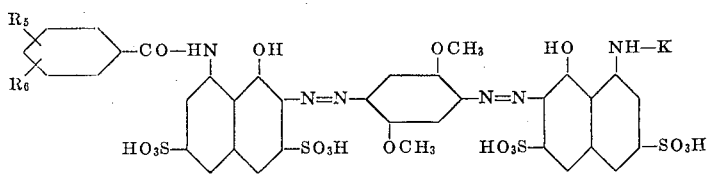

in which $R_5$, $R_6$ and K have the significance indicated in claim 3.

7. Photographic material as claimed in claim 5, that contains at least one dyestuff of the formula

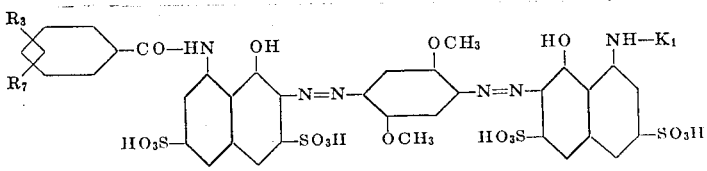

in which $K_1$ denotes the acyl radical of an alkanecarboxylic acid, benzoic acid, benzoic acid substituted by halogen, nitro, alkyl, CF$_3$, acetylamino, CH$_3$O, sulphamoyl, methylsulphamoyl, methoxycarbonyl, HOOC-alkylene-carbonyl, fumaroyl, benzenesulphonylamino, tosylamino and methylsulphonylamino, pyridine carboxylic acid or unsubstituted benzene sulphonic acid, and $R_3$ and $R_7$ have the significance indicated in claim 5.

8. Photographic material as claimed in claim 5, that contains at least one dyestuff of the formula

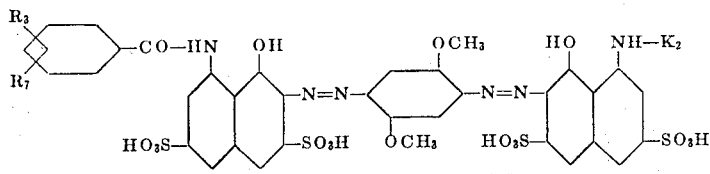

in which $K_2$ denotes the acyl radical of a benzene carboxylic acid which may be substituted by an alkylsulphone group which contain at most 5 carbon atoms, a halogen atom or a nitro, trifluoromethyl or amidosulphone group or the radical of a benzene sulphonic acid or pyridine carboxylic acid, and $R_3$ and $R_7$ have the significance indicated in claim 5.

9. Photographic material as claimed in claim 1 that contains at least one dyestuff of the formula

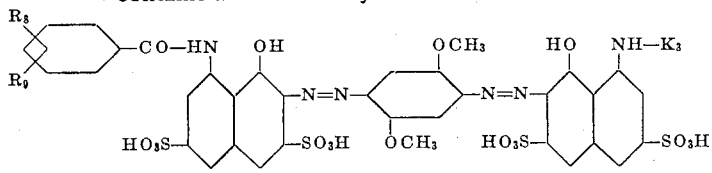

in which $R_8$ denotes a chlorine or bromine atom or a nitro, trifluoromethyl, $H_2N-SO_2-$, $H_3C-NH-SO_2-$, $H_3C-SO_2-$, $H_3C-SO_2-NH-$, $H_5C_6-SO_2-NH-$,

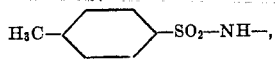

$H_5C_6-CO-NH-$, $HOOC-(CH_2)_2-CO-NH$, $HOOC-(CH_2)_3-CO-NH-$, $HOOC-CH=\lambda CH-CO-NH-$, $HOOC-$, $H_3CO-$, $H_9C_4-$,

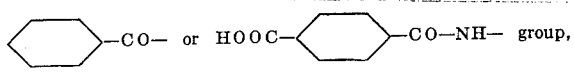

and $R_9$ denotes a hydrogen or chlorine atom, the radicals $R_8$ and $R_9$ being in the 3- and 4-positions to the $-CO-$ group, and $K_3$ represents the acyl radical of pyridine-3-carboxylic acid or of a benzene carboxylic acid of the formula

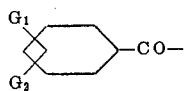

in which $G_1$ denotes a hydrogen or halogen atom and $G_2$ denotes a hydrogen or halogen atom or a nitro, trifluoromethyl or $Z_3-SO_2-$ group, in which $Z_3$ represents a lower alkyl group or unsubstituted amino group.

10. Photographic material as claimed in claim 9 that contains at least one dyestuff of the formula

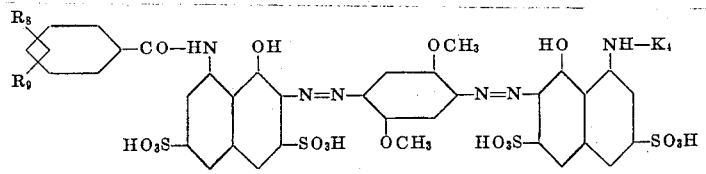

in which $K_4$ represents the acyl radical of pyridine-3-carboxylic acid or of a benzene carboxylic acid of the formula

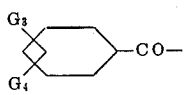

in which $G_3$ denotes a hydrogen atom or chlorine atom and $G_4$ denotes a hydrogen or chlorine atom or a nitro, trifluoromethyl or $H_2N-SO_2-$ group, and $R_8$ and $R_9$ have the significance indicated in claim 9.

11. Photographic material as claimed in claim 9, that contains at least one dyestuff of the formula

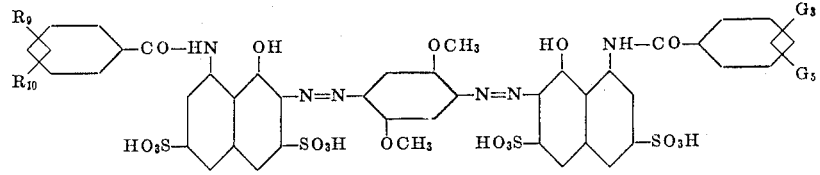

in which $G_3$ denotes a hydrogen or chlorine atom and $G_5$ denotes a hydrogen or chlorine atom or an $H_2N-SO_2-$ group, $R_{10}$ denotes a chlorine atom, a nitro or an $H_2N-SO_2-$ group, and $R_9$ has the significance indicated in claim 9.

12. Photographic material as claimed in claim 1, that contains a dyestuff of the formula

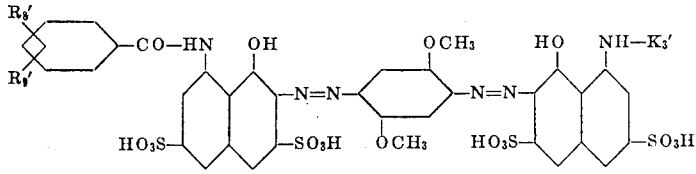

in which $R_8'$ represents a chlorine or bromine atom or a cyano, nitro, trifluoromethyl, $H_2N-SO_2-$, $H_3C-NH-SO_2-$, $H_3C-SO_2-$, $H_5C_6-SO_2-$, $H_3C-SO_2-NH-$, $H_5C_6-SO_2-NH$;

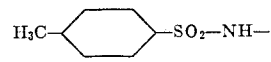

$H_5C_6-CO-NH-$, $H_5C_6-CO-$, $HOOC-(CH_2)_2-CO-NH-$, $HOOC-(CH_2)_3-CO-NH-$, $HOOC-CH=CH-CO-NH-$, $HOOC-$, $H_3CO-$, $H_3COOC-$, $H_9C_4-$ or

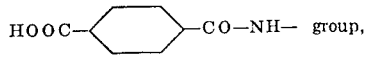

$R_9'$ represents a nitro group or a hydrogen or chlorine atom and $K_3'$ represents the acyl radical of pyridine-3-carboxylic acid, benzene sulphonic acid or a benzene carboxylic acid of the formula

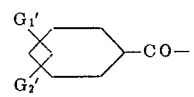

in which $G_1'$ denotes a hydrogen or chlorine atom, and $G_2'$ denotes a hydrogen or chlorine atom or a nitro, trifluoromethyl, $H_3C-SO_2-$ or $H_2N-SO_2-$ group.

13. Photographic material as claimed in claim 11 that contains a dyestuff of the formula

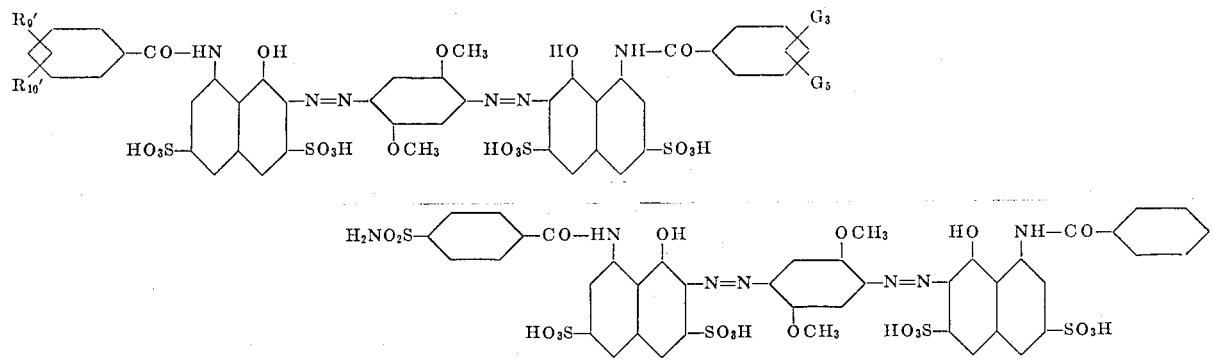

wherein $R_9'$, $G_3$ and $G_5$ have the significance indicated in claim 11 and $R_{10}'$ denotes a chlorine or bromine atom or a nitro, $H_2N-SO_2-$, $H_3CSO_2-$, $H_3COOC-$, $H_3C-SO_2-NH-$ or $NC-$ group.

14. Photographic material as claimed in claim 1 that contains at least one dyestuff of the formula

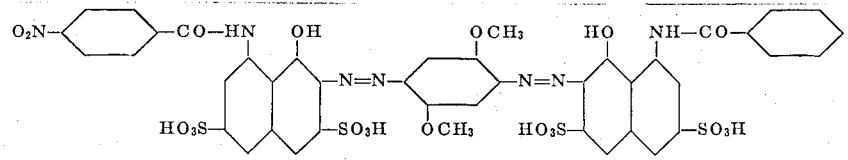

15. Photographic material as claimed in claim 1 that contains at least one dyestuff of the formula

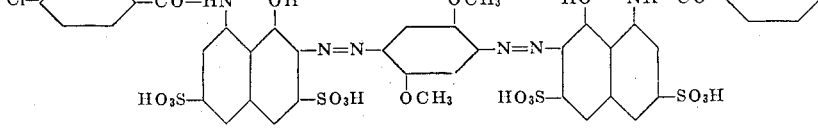

16. Photographic material as claimed in claim 1 that contains at least one dyestuff of the formula

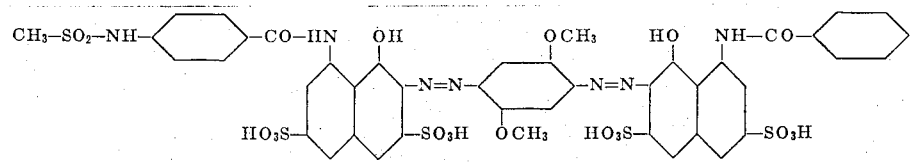

17. Photographic material as claimed in claim 1 that contains at least one dyestuff of the formula

* * * * *